United States Patent
Xu et al.

(10) Patent No.: US 12,421,115 B1
(45) Date of Patent: Sep. 23, 2025

(54) SEPARATION OF KRYPTON GAS FROM XENON GAS USING NATURAL CLINOPTILOLITE

(71) Applicant: National Technology & Engineering Solutions of Sandia, LLC, Albuquerque, NM (US)

(72) Inventors: Guangping Xu, Albuquerque, NM (US); Matthew J. Paul, Albuquerque, NM (US); Jeffery A. Greathouse, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 573 days.

(21) Appl. No.: 17/854,307

(22) Filed: Jun. 30, 2022

(51) Int. Cl.
| | |
|---|---|
| *C01B 23/00* | (2006.01) |
| *B01D 53/04* | (2006.01) |
| *B01D 53/047* | (2006.01) |
| *B01J 20/16* | (2006.01) |
| *B01J 20/34* | (2006.01) |

(52) U.S. Cl.
CPC ...... *C01B 23/0068* (2013.01); *B01D 53/0462* (2013.01); *B01D 53/0476* (2013.01); *B01J 20/165* (2013.01); *B01J 20/3408* (2013.01); *B01J 20/3483* (2013.01); *B01J 20/3491* (2013.01); *C01B 23/0078* (2013.01); *B01D 53/047* (2013.01); *B01D 2253/108* (2013.01); *B01D 2256/18* (2013.01); *B01D 2257/11* (2013.01); *C01B 2210/0018* (2013.01); *C01B 2210/0035* (2013.01); *C01B 2210/0037* (2013.01)

(58) Field of Classification Search
None
See application file for complete search history.

(56) References Cited

U.S. PATENT DOCUMENTS

| | | |
|---|---|---|
| 5,587,003 A | 12/1996 | Bulow et al. |
| 5,938,819 A | 8/1999 | Seery |
| 2024/0100470 A1* | 3/2024 | Dasappa ............ B01D 53/0476 |

FOREIGN PATENT DOCUMENTS

JP 2000171589 A * 6/2020

OTHER PUBLICATIONS

JP2000171589A_ENG (Espacenet machine translation of Munakata) (Year: 2000).*
Z. Niu et al., "Self-Adjusting Metal-Organic Framework for Efficient Capture of Trace Xenon and Krypton", Angew. Chem. Int. Ed. (2022) 61, e202117807, pp. 1-5.

(Continued)

*Primary Examiner* — Gabriel E Gitman
(74) *Attorney, Agent, or Firm* — Daniel J. Jenkins (57) ABSTRACT

A system and method for separating Kr gas from Xe gas utilizing natural clinoptilolite. The method includes separating Kr gas from Xe gas by selectively adsorbing Kr gas. The method includes providing a vessel comprising a Kr adsorbent bed comprising a natural clinoptilolite adsorbent. A feed gas comprising Kr gas and Xe gas is exposed to the Kr adsorbent bed for a residence time to selectively adsorb sufficient Kr gas from the feed gas to form a Xe enriched gas raffinate product. The Xe enriched gas raffinate product is removed from the vessel. Thereafter, the Kr adsorbent bed is regenerated to release a Kr enriched gas extract product.

19 Claims, 9 Drawing Sheets

(56) References Cited

OTHER PUBLICATIONS

J. Feldman et al., "Effects of Natural Zeolites on Field-Scale Geologic Noble Gas Transport", Journal of Environmental Radioactivity (2020), 220-221, 106279, 10 pages.
S.K. Elsaidi et al., "Radiation-Resistant Metal-Organic Framework Enables Efficient Separation of Krypton Fission Gas From Spent Nuclear Fuel", Nature Communications (2020) 11:3103, pp. 1-8, https://doi.org/10.1038/s41467-020-16647-1; www.nature.com/naturecommunications.
T. Wu et al., "Microporous Crystalline Membranes for KR/XE Separation: Comparison Between AlPO-18, SAPO-34, and ZIF-8", ACS Applied Nano Materials (2018) 1:463-470.
S. Bhadra et al., "Ideal Cascade Theory Applied to Carbon Monoxide Isotope Separation by Pressure Swing Adsorption", Adsorption (2015) 21:467-478.
J. Liu et al., "A Two-Column Method for the Separation of KR and XE From Process Off-Gases", Industrial & Engineering Chemistry Research (2014) 53:12893-12899.
P. Ryan et al., "Computational Screening of Metal-Organic Frameworks for Xenon/Krypton Separation", AIChE Journal (2011) 57(7):1759-1766.
F. Pechar et al., "Thermal Decomposition of Natural Mordenite", Chem. Papers (1987) 41(3):351-362.
G. Aguilar-Armenta et al. "Adsorption Kinetic Behaviour of Pure CO2, N2 and CH4 in Natural Clinoptilolite at Different Temperatures", Adsorption Science-Technology (2003) 21(1):81-91, https://doi.org/10.1260/02636170360699831.

* cited by examiner

SEPARATION OF KRYPTON GAS FROM XENON GAS USING NATURAL CLINOPTILOLITE

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to a method and system for separating Kr gas from Xe gas utilizing natural clinoptilolite.

BACKGROUND OF THE INVENTION

Separation and purification of krypton (Kr) gas and xenon (Xe) gas is known to be a difficult, complicated and energy intensive process. For example, cryogenic distillation is one known method to separate Kr gas and Xe gas from both air and from each other. The air fed to the cryogenic distillation column includes these noble gases in small concentrations, resulting in relatively small yields for each of the Kr and Xe gases. These technologies produce Kr gas and Xe gas utilizing a cryogenic distillation system wherein the air is fed to a cryogenic distillation column and the fractions are removed at the appropriate stages. However, the method and system of cryogenic distillation is undesirably energy intensive.

Nano porous adsorbents, such as metal-organic materials and synthetic zeolites have shown potential for concentrating Kr and Xe from their dilute gas mixtures with other off-gas components such as nitrogen or air, but metal-organic frameworks-based adsorbent all tend to be more selective for Xe compared to Kr and/or include adsorption of other gas components. Such systems suffer from the drawback that separation of Kr from the remaining air components is difficult and inefficient.

What is needed are methods and systems for separation of Kr gas from Xe gas in mixed gas streams by a selective adsorbent at or near atmospheric conditions that are more energy efficient and do not suffer from the drawbacks of prior art methods and systems.

SUMMARY OF THE INVENTION

The present disclosure is directed to a system and method for separating Kr gas from Xe gas utilizing natural clinoptilolite.

According to an embodiment of the disclosure, a method is provided for separating Kr gas from Xe gas by selectively adsorbing Kr gas. The method includes providing a vessel comprising a Kr adsorbent bed comprising a natural clinoptilolite adsorbent. A feed gas comprising Kr gas, Xe gas and optionally other gases is exposed to the Kr adsorbent bed for a residence time to selectively adsorb sufficient Kr gas from the feed gas to form a Xe enriched gas raffinate product. The Xe enriched gas raffinate product is removed from the vessel. Thereafter, the Kr adsorbent bed is regenerated to release a Kr enriched gas extract product.

According to an embodiment of the disclosure, a method is provided for purifying Kr gas from Xe gas. The method includes providing a vessel comprising a first Kr adsorbent bed comprising a natural clinoptilolite adsorbent. A feed gas comprising Kr gas, Xe gas and optionally other gases is exposed to the first Kr adsorbent bed for a residence time to selectively adsorb sufficient Kr gas from the feed gas to form a Xe enriched gas raffinate product. The Xe enriched gas raffinate product is removed from the vessel and is provided to a Xe adsorbent bed. The Xe enriched gas raffinate product is exposed to the Xe adsorbent bed for a residence time to selectively adsorb sufficient Xe gas from the feed gas to form a purified Xe stream. Thereafter, the Kr adsorbent bed is regenerated to form a Kr enriched gas extract product. The Kr enriched gas extract product is provided to a second Kr adsorbent bed for a residence time to selectively adsorb sufficient Kr gas from the feed gas to form a purified Kr stream.

According to an embodiment of the disclosure, a system is provided for separating Kr gas from Xe gas. The system includes a vessel containing a Kr adsorbent bed comprising natural clinoptilolite adsorbent. A first valve arrangement is arranged and disposed to remove a Xe enriched gas raffinate product stream from the vessel after a feed gas exposure to the Kr adsorbent bed. A second valve arrangement and regenerator are arranged and disposed to regenerate the Kr adsorbent bed and provide a Kr enriched gas extract product stream.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Advantages of embodiments of the present disclosure include separation of Kr from Xe in mixed gas feeds without many of the disadvantages of the prior art. For example, the system and method of the present disclosure allows separation and purification of Kr gas at or near atmospheric conditions, permitting a separation with less energy intensive processes and at reduced capital equipment costs. In addition, the adsorbent materials utilized for the separation are readily available and require little preparation prior to utilization in the process according to the present disclosure. For example, natural clinoptilolite is abundant in zeolitic tuffs and are readily minable. Further, the process according to the present disclosure is scalable from niche separations, such as separation of radioactive Kr and Xe in nuclear fuel reprocessing and radiopharmaceutical production facilities, to larger industrial gas separation processes for production of Kr and Xe gases. In addition, because the time the feed gas is exposed to the clinoptilolite adsorbent is brief in each stage, the specific throughput of each vessel is high relative to conventional Xe adsorbents, reducing the size of the vessels and quantity of adsorbent necessary.

In order to facilitate the separation of Kr gas from Xe gas in mixed gas streams according to methods according to the present disclosure, a natural clinoptilolite adsorbent, a specific natural zeolite that preferentially removes Kr gas via adsorption from a mixed gas streams is utilized. It has been unexpectedly discovered that exposing dilute gas streams including mixtures of Kr gas and Xe gas in air to natural clinoptilolites shows a strong initial adsorptive selectivity for Kr gas over Xe gas. After the initial period of strong initial adsorptive selectivity for Kr gas, Xe gas is likewise adsorbed into the natural clinoptilolite material. The initial period for the strong initial adsorptive selectivity for Kr gas may last for a period of hours to days, depending on the size and form of clinoptilolite adsorptive material. For example, the time of strong initial adsorptive selectivity for Kr gas may be shorter for finer, higher surface area material forms, such as powders, wherein the time of strong initial adsorptive selectivity for Kr gas may be longer for lower surface area material forms, such as plugs, chips, or bulk rocks. Xe gas will eventually penetrate and adsorb a greater amount than Kr gas within the natural clinoptilolite material. While not wishing to be bound by theory or explanation, it is believed that during the initial period where the Kr gas is readily adsorbed into the natural clinoptilolite material, the permeation of Xe gas into the natural clinoptilolite is kinetically limited.

Adsorption, as utilized herein, is the process wherein a solute, such as a gas, is retained in a microcrystalline structure of a solid by physical or chemical forces. Adsorbents, as utilized herein, are material of a microcrystalline structure having an internal pore structure accessible for selective combination of solid and solute, such as a gas, wherein the solute is reversibly retained in the structure by physical or chemical forces.

Figure 1:
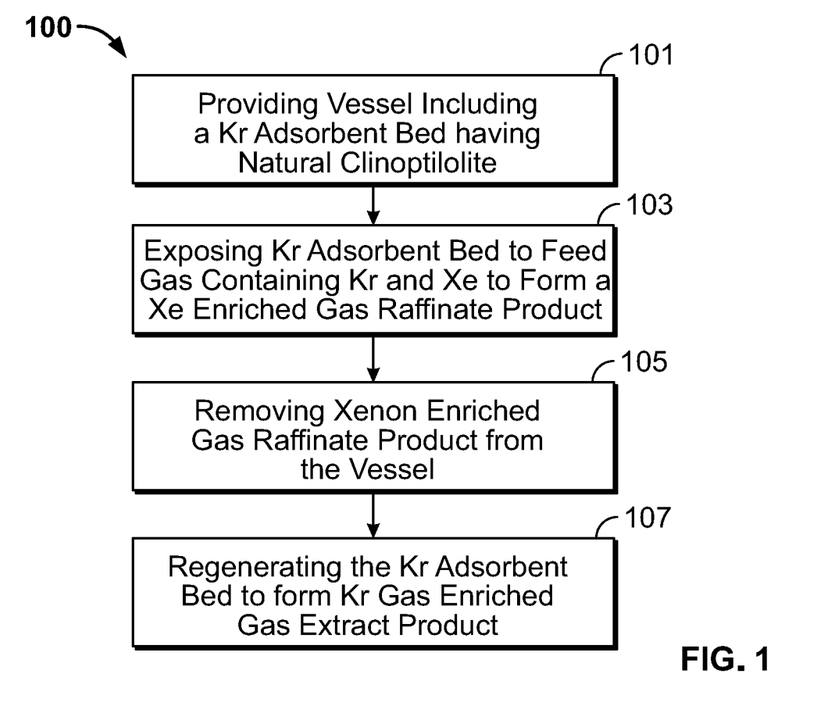
FIG. 1 shows a flowchart illustrating a process for separating Kr gas from Xe gas according to an embodiment of the present disclosure.

FIG. 1 shows a method 100 according to an embodiment of the present disclosure. Method 100 includes separating Kr gas from Xe gas by selectively adsorbing Kr gas. A vessel 203 is provided having a Kr adsorbent bed 205 comprising a natural clinoptilolite adsorbent (step 101) (see also FIG. 2). The Kr adsorbent bed 205 may be exposed to atmospheric conditions to prepare the Kr adsorbent bed 205 for exposure to a feed gas 201. In other embodiments, the Kr adsorbent bed 205 may be exposed to a vacuum to prepare the Kr adsorbent bed 205 for exposure to the feed gas 201. In still another embodiment, the Kr adsorbent bed 205 may be heated to prepare the Kr adsorbent bed 205 for exposure to the feed gas 201. The feed gas 201 including Kr gas and Xe gas is exposed to the Kr adsorbent bed 205 for a residence time to selectively adsorb sufficient Kr gas from the feed gas 201 to form a Xe enriched gas raffinate product (step 103). Xe enriched gas raffinate product, as utilized herein, is a gas having a concentration of Xe that is greater than the concentration of Xe prior to the exposure to the Kr adsorbent bed 205. The enrichment of Xe enriched gas raffinate product may, for example, be determined or approximated by the Kr and Xe adsorption isotherms (see, for example, FIG. 4). In addition to the properties of the adsorbent providing the enrichment of the Xe enriched gas raffinate product, the actual separation of gasses per stage (i.e., exposure to a Kr adsorbent bed 205) may also depend on how tightly the Kr adsorbent bed 205 is packed with adsorbent and how long the feed gas 201 is exposed. The feed gas 201 may be exposed to the Kr adsorbent bed 205 at or near atmospheric conditions. In another embodiment, the stream may be refrigerated at temperatures less than atmospheric, such as temperatures about 0° C. In addition, the exposure may be provided at temperatures higher than atmospheric pressure. In this embodiment, the higher pressure may permit a reduced volume of the system. For example, higher pressure may reduce system volume and for modest pressures, such as from 1 to 10 atm.

Figure 2:
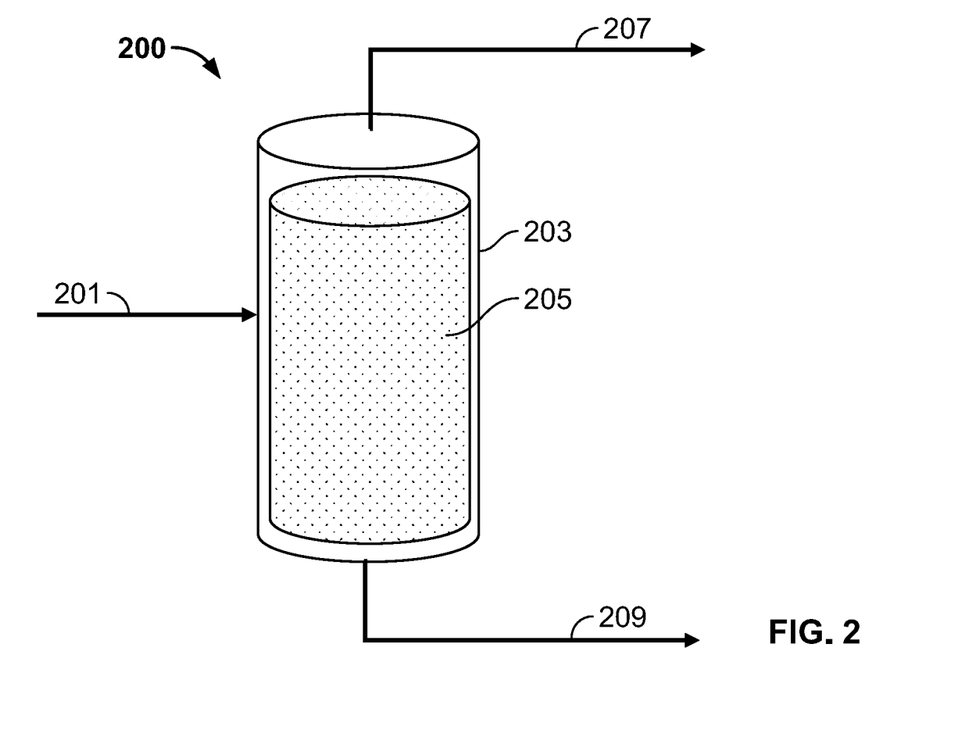
FIG. 2 schematically illustrates a system for separating Kr gas from Xe gas according to an embodiment of the present disclosure.

In another embodiment, the residence time for exposing the feed gas 201 comprising Kr gas and Xe gas to the adsorbent bed 205 is for a time sufficient to maintain a greater Kr uptake amount than Xe uptake amount for the Kr adsorbent bed 205. That is, the residence time is a time duration where the amount of Kr uptake is greater than the Xe uptake.

In another embodiment, the time to selectively adsorb the Kr gas is less than or equal to 70%, or less than or equal to 60%, or less than or equal to 50%, or less than or equal to 40%, or less than or equal to 35%, or less than or equal to 30%, or less than or equal to 25%, or less than or equal to 20%, or less than or equal to 15%, or less than or equal to 10%, or less than or equal to 5%, or less than or equal to 2%, or less than or equal to 1% of the total time to equilibrium of Kr gas within the Kr adsorbent bed 205. Equilibrium of Kr gas within the adsorbent bed, as utilized herein, is defined as the state wherein the uptake of Kr gas into the adsorbent bed is equal to or greater than 95% of the total Kr uptake for the adsorbent bed.

In another embodiment, the residence time for exposing the feed gas 201 comprising Kr gas and Xe gas to the Kr adsorbent bed 205 is for a time equal to or less than 3 hours, or equal to or less than 2 hours, or equal to or less than 1½ hours, or equal to or less than 1 hour, or equal to or less than 45 minutes, or equal to or less than 30 minutes or less than or equal to 15 minutes.

The Xe enriched gas raffinate product is removed from the vessel (step 105) and, thereafter, the Kr adsorbent bed 205 is regenerated to release a Kr enriched gas extract product (step 107). Kr enriched gas extract product, as utilized herein, is a gas having a concentration of Kr that is greater than the concentration of Kr prior to the exposure to the Kr adsorbent bed 205. Regeneration is a step wherein the Kr adsorbent bed 205 is exposed to conditions that result in a desorbing of the Kr gas. Method 100 utilizes the unique kinetic features of the natural clinoptilolite adsorbent, which provides a strong initial preferentially adsorption of Kr gas, to separate Kr gas from Xe gas, preferably through sequential cycles of adsorption and desorption (i.e., regeneration) processes. In one embodiment, the adsorption and desorption (i.e., regeneration) processes may be a pressure/temperature or vacuum swing adsorption/desorption process.

FIG. 2 shows a system 200 for separation of Kr from Xe in a feed gas 201 according to the present disclosure. The system 200 includes a vessel 203 containing a Kr adsorbent bed 205 comprising an adsorbent that selectively adsorbs Kr gas. Suitable adsorbents include a natural clinoptilolite adsorbent. A first valve arrangement (see for example FIGS. 4 and 5) is arranged and disposed to remove a Xe enriched gas raffinate product stream 207 from the vessel 203 after a feed gas exposure to the Kr adsorbent bed 205. A second valve arrangement (see for example FIGS. 4 and 5) and regenerator (see for example FIGS. 4 and 5) are arranged and disposed to regenerate the Kr adsorbent bed 205 and provide a Kr enriched gas extract product stream 209. The positioning of the Kr adsorbent bed 205 within vessel 203 is not particularly limited, but the absorbent bed 205 is preferably positioned and retained within vessel 203 to permit flow of gas and contact of the gas with the materials of the Kr adsorbent bed 205. The Kr adsorbent bed 205 according to the present disclosure includes a natural clinoptilolite absorbent. Suitable natural clinoptilolite absorbents include, for example, a variety of the natural zeolite, clinoptilolite. Natural clinoptilolite generally has as exchangeable cations one or more of potassium ions, sodium ions, calcium ions and magnesium ions. Suitable natural clinoptilolite absorbent may include cation-exchanged natural clinoptilolites. Preferred Group IA ions are sodium, potassium, and lithium ions; preferred Group IIA ions are magnesium, calcium, strontium, and barium ions; preferred Group IIIA and IIIB ions are aluminum, scandium, gallium, indium, and yttrium; and preferred trivalent lanthanide ions are lanthanum, cerium, praseodymium, and neodymium. The most preferred clinoptilolites are the natural clinoptilolites having as exchangeable cations one or more ions selected from: sodium, potassium, lithium, calcium, magnesium, and barium ions. Natural clinoptilolite may include a sodium-rich clinoptilolite with the approximate chemical formula $Na_6[Al_6Si_3OO_{72}] \cdot 24H_2O$. In certain embodiments, minor amounts of the sodium may be replaced by calcium, potassium, or magnesium in the natural state. The natural clinoptilolite absorbent may be formed by mining the natural clinoptilolite from a natural clinoptilolite deposit, such as a zeolitic tuff, wherein the mined deposit may be drilled, crushed, pulverized and/or screened to form a suitable bed material. The adsorbent material of adsorbent bed 205 may include a solid core, crushed, or pulverized material that may optionally be screened to a desired size. In one embodiment, the bed material may be prepared, for example, by heating or acid treatment.

System 200 further includes a Xe enriched gas raffinate product stream 207 that is removed from vessel 203 after the feed gas 201 has been exposed to Kr adsorbent bed 205. After the Xe enriched gas raffinate product stream 207 is removed, the Kr adsorbent bed 205 is regenerated to desorb the material within the adsorbent bed 205 to release the Kr enriched gas extract product stream 209.

Figure 3:
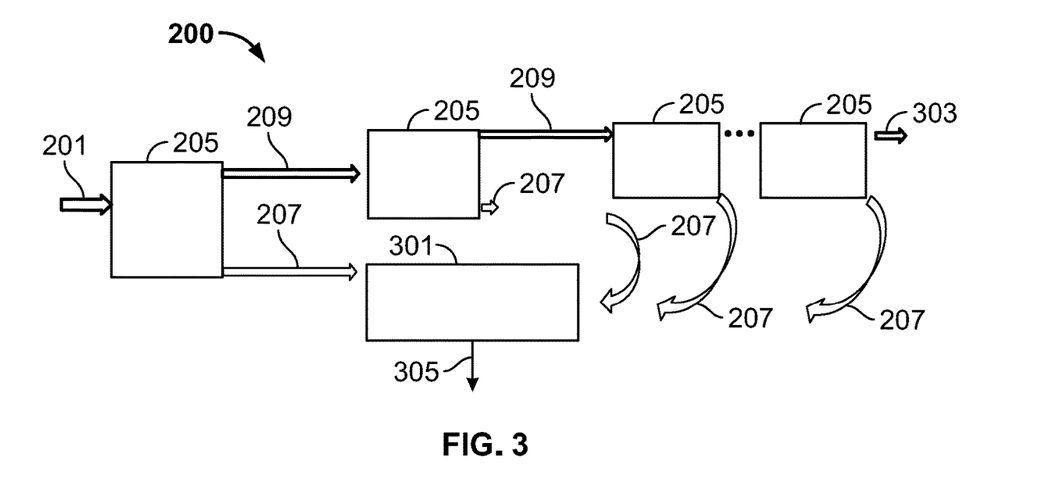
FIG. 3 schematically illustrates a system for purifying Kr gas from Kr and Xe mixed gas stream according to an embodiment of the present disclosure.

FIG. 3 shows a system 200 for purifying both Kr gas and Xe gas from a feed gas 201 that includes a mixture of gases that includes Kr and Xe gas. As shown in FIG. 3, system 200 includes a series of Kr adsorbent beds 205. The feed gas 201 is initially fed to a first Kr adsorbent bed 205 including a natural clinoptilolite absorbent. As described above with respect to method 100, the feed gas 201 including Kr gas and Xe gas is exposed to the Kr adsorbent bed 205 for a residence time to selectively adsorb sufficient Kr gas from the feed gas 201 to form a Xe enriched gas raffinate product stream 207, which is removed and sent to a Xe adsorbent bed 301 having an adsorbent that preferentially adsorbs Xe at a greater rate than Kr. For example, the adsorbent material for use in Xe adsorbent bed 301 may include any suitable adsorbent known for Xe gas adsorption. After the Xe enriched gas raffinate product stream 207 is removed from the first Kr adsorbent bed 205, the first Kr adsorbent bed 205 is regenerated to desorb the Kr gas from the first Kr adsorbent bed 205 to form a Kr enriched gas extract product stream 209. As shown in FIG. 3, method 100 is repeated to form a Xe enriched gas raffinate product stream 207, which is fed to the Xe adsorbent bed 301 and a Kr enriched gas extract product stream 209, which is fed to the next stage Kr adsorbent bed 205. The process is repeated until the desired purity of Xe gas and Kr gas is achieved. The repeated process forms a purified Kr stream 303 from the multiple stages of Kr adsorbent beds 205 and a purified Xe stream 305 from the Xe adsorbent bed 301.

Figure 4:
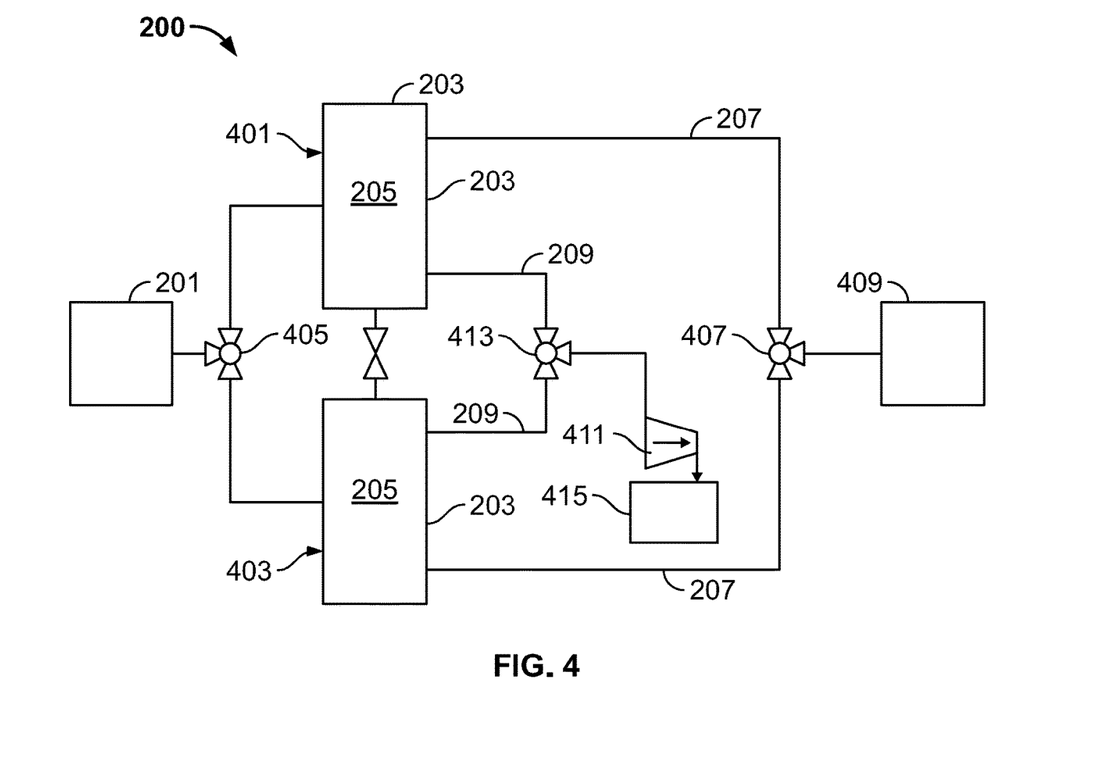
FIG. 4 schematically illustrates a system for separating Kr gas from Xe gas according to another embodiment of the present disclosure.

FIG. 4 shows a system 200 according to an alternate embodiment of the present disclosure for separation of Kr from Xe in a feed gas 201 utilizing a two-bed vacuum swing adsorption (VSA) process. As shown in FIG. 3, the feed gas 201 is directed to either the first Kr adsorbent bed 401 or second Kr adsorbent bed 403 via first three-way valve 405. To process feed gas 201, the feed gas 201 is fed to one of the first Kr adsorbent bed 401 or second Kr adsorbent bed 403. A first valve arrangement, including second three-way valve 407 is arranged and disposed to remove a Xe enriched gas raffinate product stream 207 from the vessel 203 after a feed gas 201 exposure to the Kr adsorbent bed 205. The feed gas 201 is exposed to natural clinoptilolite absorbent in the Kr adsorbent bed 205 according to the method 100 of the present disclosure wherein a Xe enriched gas raffinate product stream 207 is formed and a second third three-way valve 407 directs the Xe enriched gas raffinate product stream 207 to form a combined Xe raffinate 409 having a higher concentration of Xe gas than the feed gas 201. A second valve arrangement, including third three-way valve 413 and a regenerator including vacuum pump 411 are arranged and disposed to regenerate the Kr adsorbent bed 205 and release the Kr enriched gas extract product stream 209. The Kr adsorbent bed 205 is regenerated using a vacuum pump 411 to form a Kr enriched gas extract product stream 209. Suitable conditions for regeneration may include, but are not limited to a vacuum of up to $1\times10^{-5}$ mbar for up to 12 hours. In one embodiment, a vacuum of from 1 to 10 mbar may be utilized. In still another embodiment, the Kr adsorbent bed may be heated. A third three-way valve 413 is utilized to regenerate either the first Kr adsorbent bed 401 or second Kr adsorbent bed 403 with vacuum pump 411 depending on which bed requires regeneration. The regeneration results in a combined Kr raffinate 415 having a higher concentration of Kr gas than the feed gas 201. The first three-way valve 405, the second three-way valve 407 and the third three-way valve 413 may be utilized to alternate vessels and allow a more continuous operation of exposure and regeneration.

Figure 5:
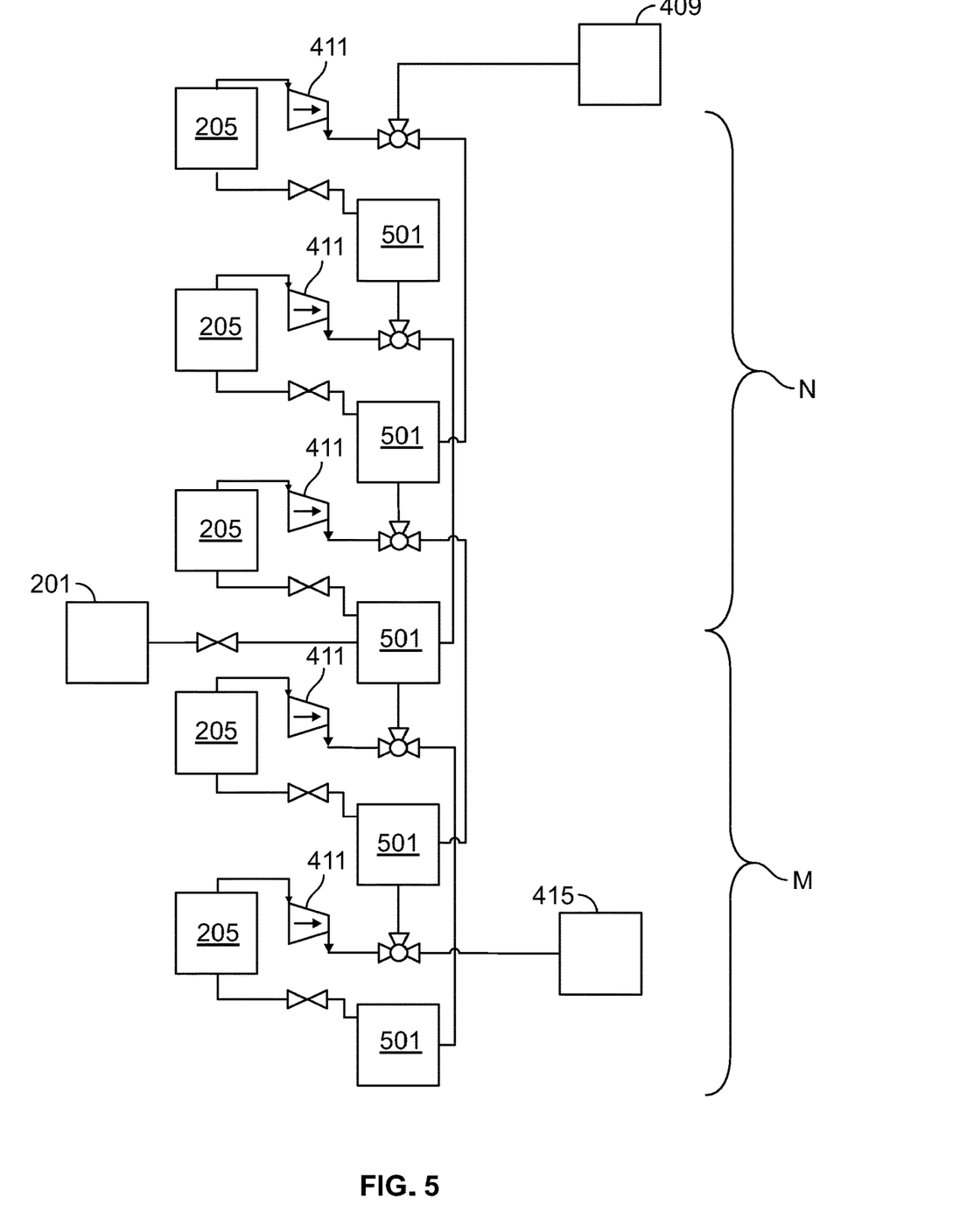
FIG. 5 schematically illustrates a system for purifying Kr gas and Xe gas according to another embodiment of the present disclosure.

FIG. 5 shows a system 200 according to an alternate embodiment of the present disclosure for purification of Kr gas and Xe gas from a mixed gas feed gas 201 utilizing a cascading kinetic separation process. The system 200 of FIG. 5 includes a design methodology applying a cascade theory to kinetic separation of Kr—Xe mixtures.

As shown in FIG. 5, the gas from the feed gas 201 is initially accumulated in a receiver 501 and is accumulated in receivers 501 after Kr adsorbent beds 205 at each stage. Receiver 501 is a pressure vessel 203 that holds the raffinate from lower stages and extracts from higher stages before the next cycle is ready. From receiver 501, the feed gas 201 is provided to a Kr adsorbent bed 205 and subjected to the method 100 according to the present disclosure wherein a Kr enriched gas extract product stream 209 and Xe enriched gas raffinate product stream 207 as described above. A first valve arrangement is arranged and disposed to remove a Xe enriched gas raffinate product stream 207 from the vessel 203 after a feed gas 201 exposure to the Kr adsorbent bed 205. In the stages, if the feed is a mixture of Kr/Xe, the raffinate from the top stage is purified Xe and the extract from the bottom stage, after regeneration using a vacuum pump 411 is purified Kr. The cascade arrangement of adsorbent beds 205 and transfer pumps is more efficient. A second valve arrangement, including valves and a regenerator including vacuum pump 411 are arranged and disposed to regenerate the Kr adsorbent bed 205 and release the Kr enriched gas extract product stream 209. Rather than alternating between two adsorbent beds 205 as shown and described in FIG. 5, in this embodiment, the feed gas 201 for each stage is initially stored in a receiver 501, which is an appropriately sized pressure vessel for the process. Each stage is concurrently released to the corresponding adsorbent bed 205. After the corresponding exposure time, the transfer pump sends the first cut, primarily raffinate, to the receiver 501 of the next Xe stage. After the initial cut, the Kr enriched tails are directed to the receiver 501 of the next Kr stage. After the stages are desorbed, the process repeats. As shown in FIG. 5, any number of stages can be daisy-chained to reach the desired purity of both the Xe raffinate and Kr extract. The appropriate number of Xe stages (N) and Kr stages (M) depends upon the feed mixture composition and the separation performance of the clinoptilolite adsorber bed. The final stages (N or M) differ in that either the raffinate or the extract is collected as the product, rather than being redirected to another stage. The appropriate number of enrichment (N) vs stripping (M) stages will vary depending on the initial feed composition and the desired purity of the two products. The purity of the Kr gas and the Xe gas formed by the embodiment of FIG. 5 may produce gas having up to 90% purity or greater.

Example

Inventive examples of the method according to the present disclosure were performed utilizing clinoptilolite that was purchased from KMI zeolite (https://www.kmizeolite.com/; 97% pure as reported by KMI) and was formed after the alteration of volcanic ash. Synthetic mordenite was purchased from Alfa Aesar, Thermo Fisher Scientific (https://www.alfa.com/en/catalog/045876/).

Figure 10A:
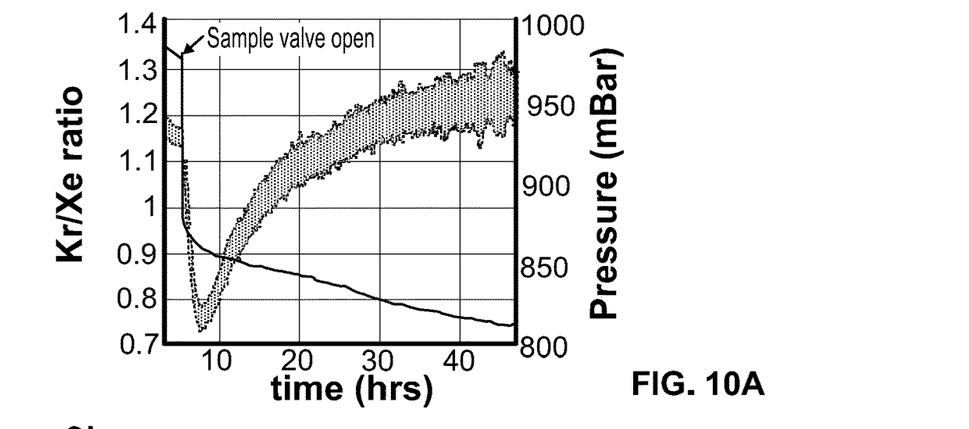
FIG. 10A is a graph showing $Kr/N_2$ and $Xe/N_2$ ratios for multi-gas injections of Kr, Xe and Ar into a reference chamber which was previously in equilibrium with air with sample chamber containing a natural clinoptilolite plug as in FIG. 9.
Figure 10B:
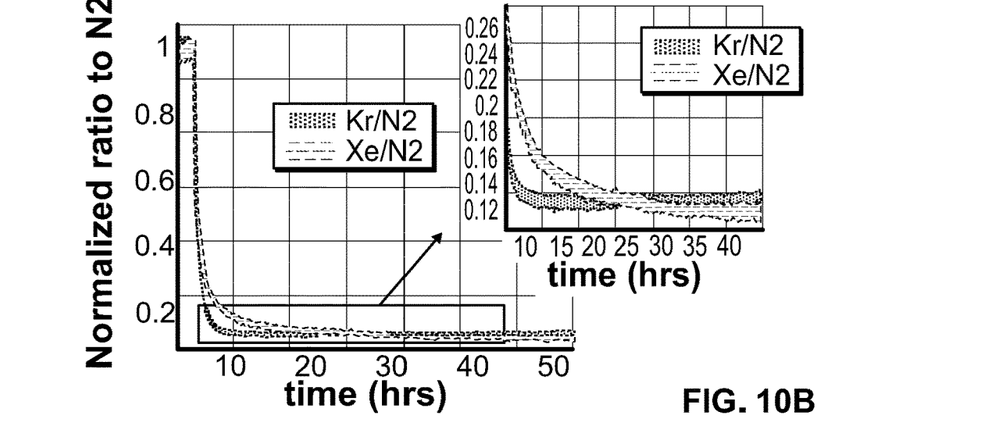
FIG. 10B is a graph showing $Kr/N_2$ and $Xe/N_2$ ratios for multi-gas injections of Kr, Xe and Ar into a reference chamber which was previously in equilibrium with air with sample chamber containing a natural clinoptilolite plug as in FIG. 9.

As shown, for example, in FIGS. 10A and 10B, Xe and Kr containing gas in contact with natural clinoptilolite is depleted in both Kr and Xe after long exposure times. However, at short exposure times (for example, less than a few hours for a 1" plug), Kr significantly penetrates the clinoptilolite plug while the Xe does not. Molecular dynamics modeling of clinoptilolite suggests that there is a kinetic barrier for Xe diffusion. Thus, if a mixture of Kr and Xe is put into brief contact with evacuated clinoptilolite, the Kr is primarily adsorbed while the Xe is primarily excluded.

Adsorption isotherms for Kr and Xe at 27° C. using powders were measured on a Micromeritics ASAP 2020 analyzer and a water bath system was used to maintain the constant temperature. Pressure readings were taken every 10 seconds and was assumed to be in equilibrium if the pressure readings did not change over the 10 second interval.

Figure 6:
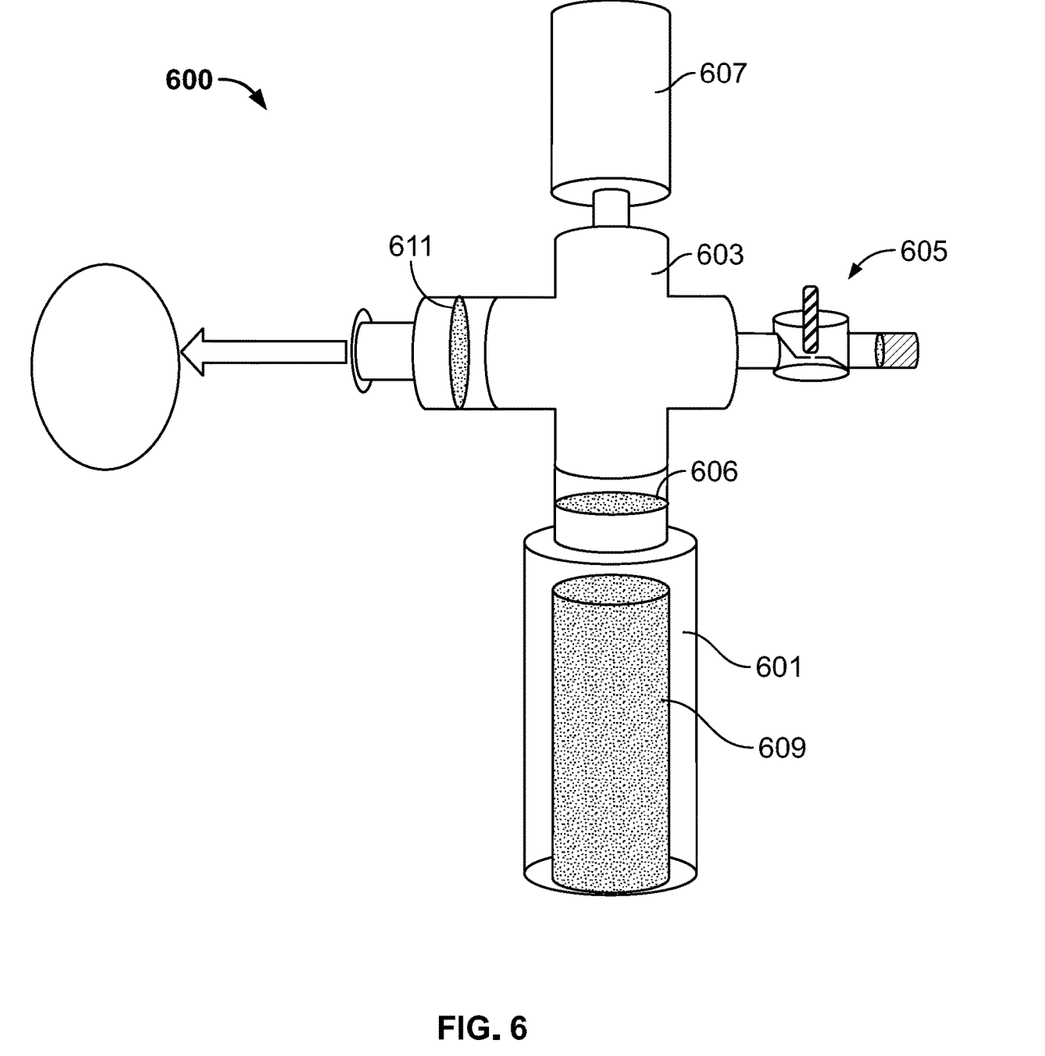
FIG. 6 shows multi-tracer adsorption data obtained utilizing a self-assembled gas analyzer system.

Multi-tracer adsorption data was obtained utilizing a self-assembled gas analyzer system 600, as shown in FIG. 6. Both sample chambers 601 and reference chambers 603 are in equilibrium with ambient air before multiple tracers (equimolar amounts of Kr, Xe, and Ar) are injected via an injection port 605. After injection, tracer gases are permitted to reach equilibrium with ambient air in the reference chamber 603 until ratios of $Kr/N_2$ (or Kr/Ar) and $Xe/N_2$ (or Xe/Ar) do not change before opening a butterfly sample valve 606 to begin the adsorption process. Quadrupole mass spectrometer 607 records intensities of $N_2$, Ar, Kr and Xe leaking from the reference chamber continuously after the tracer injection. The samples 609 used for multi-tracer measurements are either a 1" diameter core plug or 2×4 mm chips for clinoptilolite. A synthetic 1" diameter plug was made using mordenite powder by pellet presser of 15 metric ton force. A vent 611 is provided to vent the reference chamber 603 to atmospheric conditions or vacuum conditions.

Figure 7A:
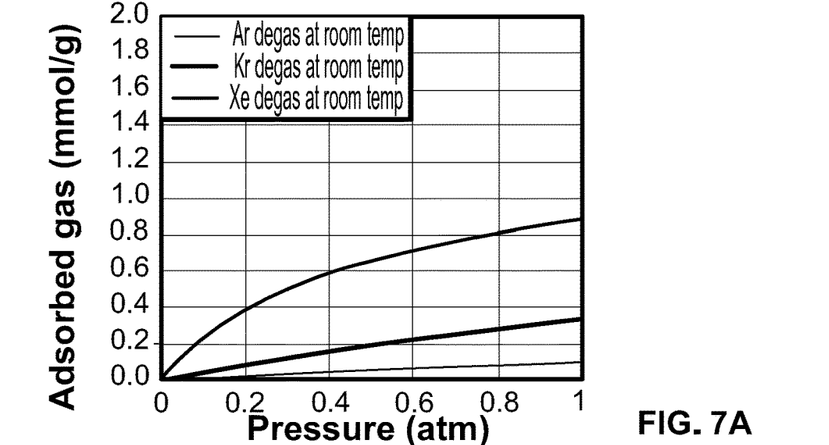
FIG. 7A is a graph displaying Xe, Kr and Ar gas adsorption isotherms at 27° C. to compare synthetic mordenite powders with different water contents degassed at room temperature.
Figure 7B:
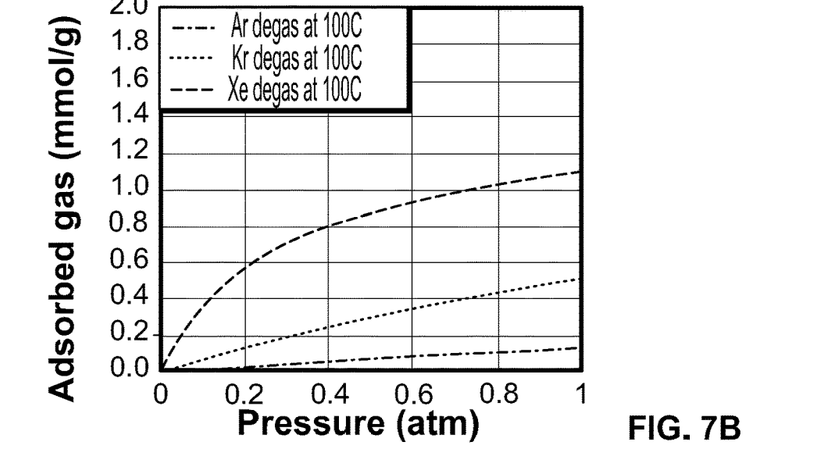
FIG. 7B is a graph displaying Xe, Kr and Ar gas adsorption isotherms at 27° C. to compare synthetic mordenite powders with different water contents degassed at 100° C.
Figure 7C:
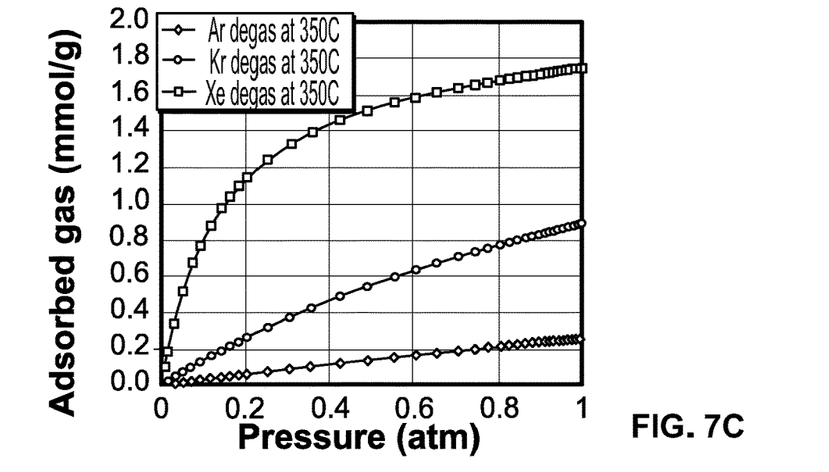
FIG. 7C is a graph displaying Xe, Kr and Ar gas adsorption isotherms at 27° C. to compare synthetic mordenite powders with different water contents degassed at 350° C.

FIGS. 7A through 7C show Xe, Kr and Ar gas adsorption isotherms at 27° C. for synthetic mordenite powders with differing water contents as determined by different degas temperatures. For powders degassed at room temperature (FIG. 7A), there is approximately 10-13% residual water whereas the degassed at 350° C. (i.e., dry mordenite) (FIG. 7C) removes essentially all the water. Mordenite exhibits the expected adsorption trend with Xe>Kr>Ar and dry mordenite adsorbs more gases than the sample containing the residual water.

Figure 8A:
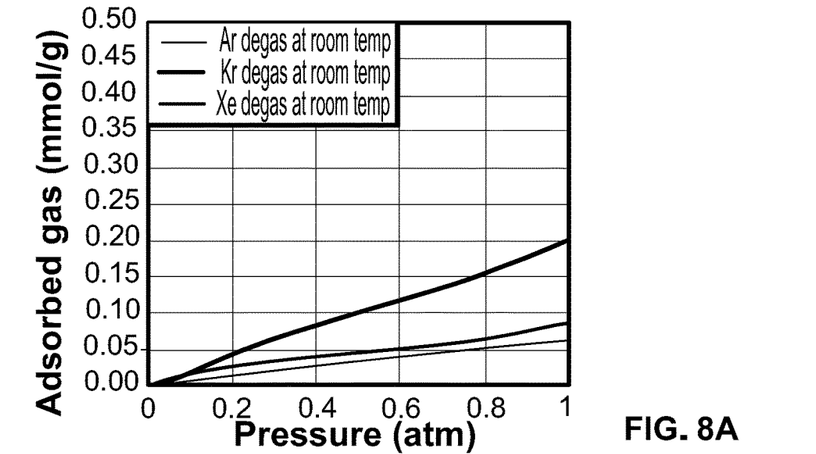
FIG. 8A is a graph displaying Xe, Kr and Ar gas adsorption isotherms at 27° C. for natural clinoptilolite powders with different water contents degassed at room temperature.
Figure 8B:
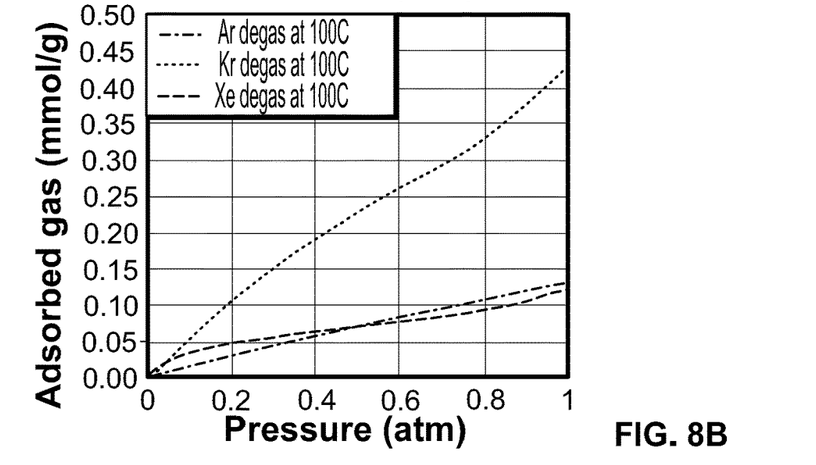
FIG. 8B is a graph displaying Xe, Kr and Ar gas adsorption isotherms at 27° C. for natural clinoptilolite powders with different water contents degassed at 100° C.
Figure 8C:
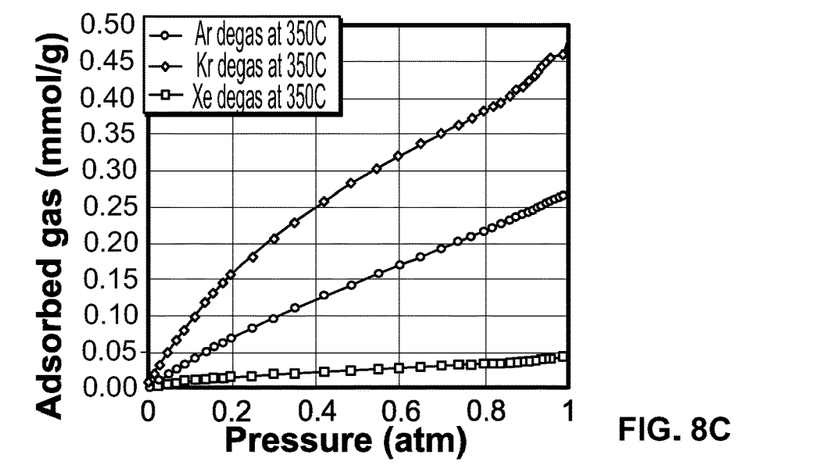
FIG. 8C is a graph displaying Xe, Kr and Ar gas adsorption isotherms at 27° C. for natural clinoptilolite powders with different water contents degassed at 350° C.

FIGS. 8A through 8C show Xe, Kr and Ar gas adsorption isotherms at 27° C. for natural clinoptilolite powders with differing water contents as determined by different degas temperatures according to the present disclosure. For powders degassed at room temperature (FIG. 8A), there is approximately 10-13% (mass) residual water whereas the sample degassed at 350° C. (i.e., dry natural clinoptilolite) (FIG. 8C) removes essentially all the water. In all three cases, Kr adsorbed is greater than Xe and with increasing degas temperature (less water content), Kr adsorption increases significantly whereas Xe adsorption decreases eventually.

Mordenite exhibits the expected adsorption trend (Xe>Kr>Ar) and adsorbs more heavier gas than lighter gases (FIGS. 7A-7C), however, natural clinoptilolite adsorbs more Kr than Xe consistently with different level of water contents (FIGS. 8A-8C). The capacity of Kr adsorption increases with decreasing amount of water content whereas Xe capacity decreases in dry clinoptilolite (FIGS. 8A-8C).

Figure 9:
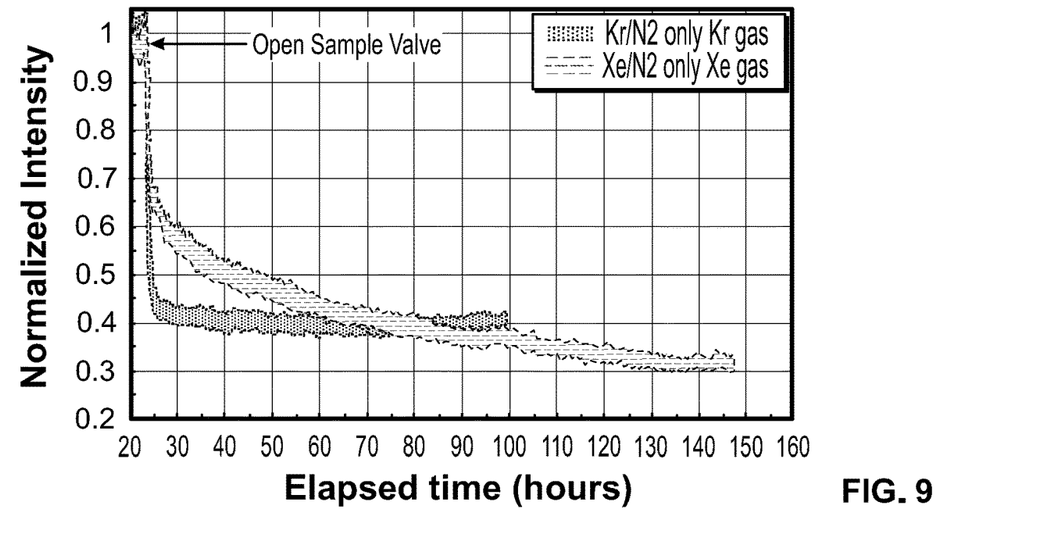
FIG. 9 is a graph showing $Kr/N_2$ and $Xe/N_2$ ratios changing with time of single gas injections of Kr or Xe into a reference chamber which was previously in equilibrium with air with sample chamber containing a natural clinoptilolite plug.

FIG. 9 is a graph showing $Kr/N_2$ and $Xe/N_2$ ratios of single gas injections of Kr or Xe into a reference chamber and 1" diameter natural clinoptilolite plug that has been exposed to vacuum in the sample chamber and subsequently was permitted to be in equilibrium with ambient air. Before injection, both reference and sample chambers are permitted to reach equilibrium with ambient air. When the sample valve was opened, $Kr/N_2$ ratio in the reference chamber dropped quickly to approximately 40% of initial value and reached equilibrium within a few hours. $Xe/N_2$ ratio dropped slowly and did not reach equilibrium until tens of hours later. These results show that higher amounts of Kr are adsorbed by clinoptilolite than Xe during the initial period. Note that the volume of reference chamber is about twice of the sample chamber which was kept the same for all measurements.

FIGS. 10A and 10B are graphs showing $Kr/N_2$ and $Xe/N_2$ ratios for multi-gas injections of Kr, Xe and Ar into a reference chamber. The clinoptilolite plug is permitted to reach equilibrium with ambient air, then tracer mixtures of Xe, Kr, and Ar are injected. The gas concentrations in the reference chamber are approximately 6% for Kr and Xe, respectively, and 6.6% for Ar. When the sample valve is opened, the ratio of Kr/Xe drops quickly from 1.15 to 0.75 due to preferential adsorption of Kr over Xe (FIG. 10A). Xenon adsorption gradually increases and eventually overpasses Kr after more than 35 hours (FIG. 10B). Note that in these multi-tracers test, the reference chamber volume is about half of the sample chamber, smaller than in pure tracer tests.

Figure 11A:
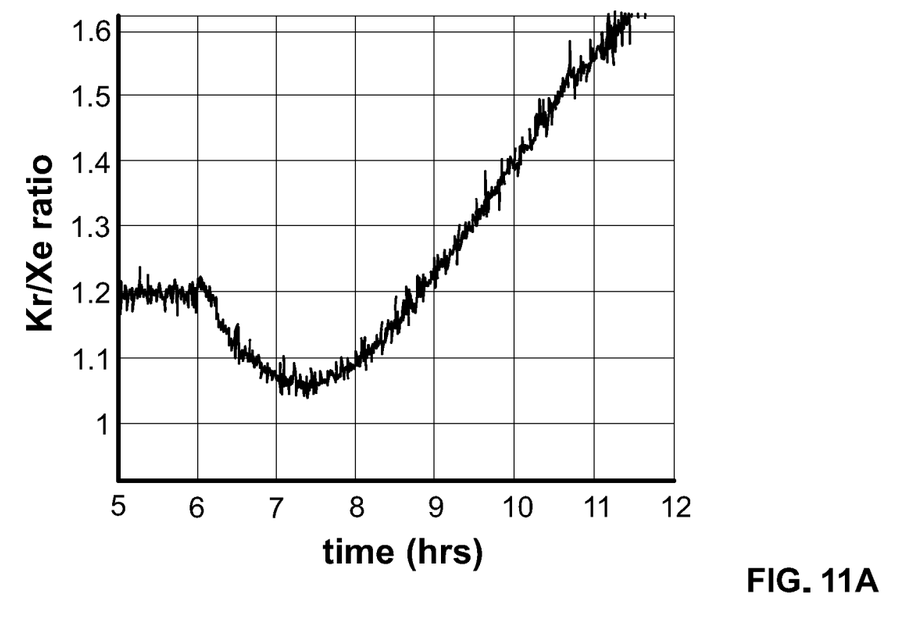
FIG. 11A is a graph showing Kr/Xe ratio for multi-gas injections of Kr, Xe and Ar into a reference chamber which was previously in equilibrium with air with sample chamber containing natural clinoptilolite chips as in FIG. 9.
Figure 11B:
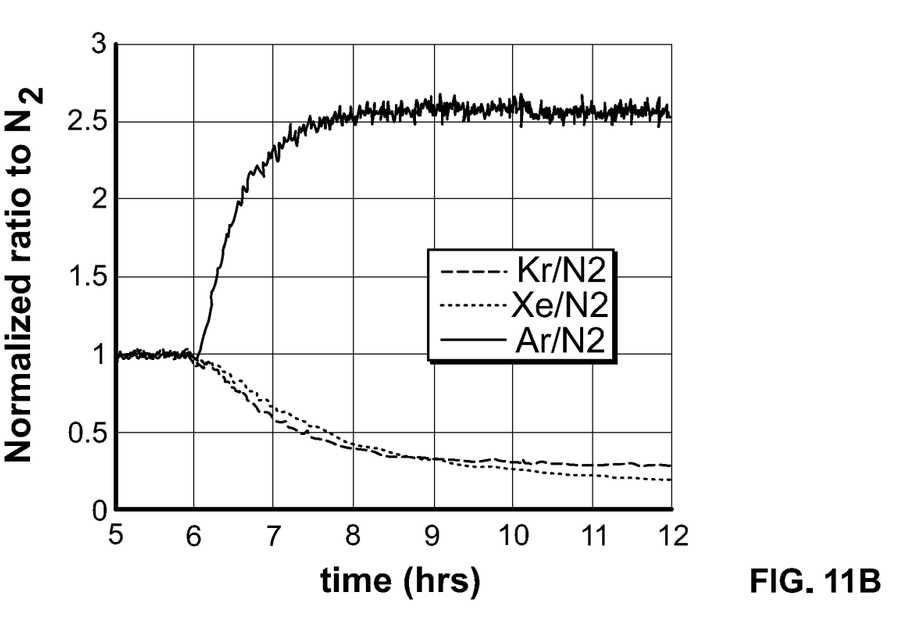
FIG. 11B is a graph showing $Kr/N_2$, $Xe/N_2$ and $Ar/N_2$ ratios for multi-gas injections of Kr, Xe and Ar into a reference chamber in experiment in FIG. 11A.

FIGS. 11A and 11B are graphs showing $Kr/N_2$, $Xe/N_2$ and $Ar/N_2$ ratios multi-gas injections of Kr, Xe and Ar into a reference chamber. Clinoptilolite chips were permitted to reach equilibrium with ambient air and multi-tracers Xe, Kr, Ar were injected. The concentrations in the reference chamber are approximately 6% for Kr and Xe, respectively, and 6.6% for Ar. When the sample valve was opened, the ratio of Kr/Xe dropped from 1.2 to 1.05 due to preferentially adsorption of Kr over Xe (FIG. 11A). Xenon adsorption is gradually increased and eventually overpasses Kr within 3 hours (FIG. 11B). Note that the volume of reference chamber is about half of the sample chamber which was kept the same for all measurements.

Figure 12:
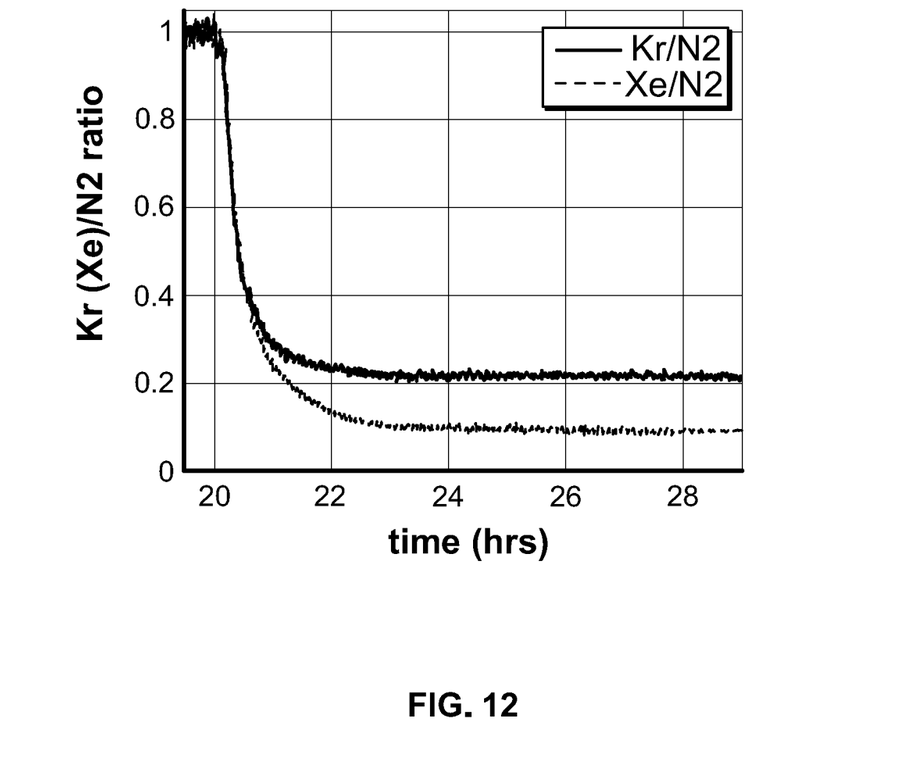
FIG. 12 is a graph showing $Kr/N_2$ and $Xe/N_2$ ratios multi-gas injections of Kr, Xe and Ar into a reference chamber which was previously in equilibrium with air with sample chamber containing a synthetic mordenite plug.

FIG. 12 is a graph showing $Kr/N_2$ and $Xe/N_2$ ratios multi-gas injections of Kr, Xe and Ar into a reference chamber according to a comparative example. The synthetic mordenite plug was equilibrium with ambient air and multi-tracers Xe, Kr, Ar were injected. The concentrations in the reference chamber are approximately 6% for Kr and Xe, respectively, and 6.6% for Ar. When the sample valve was opened, the ratio of Kr/Xe decreased quickly due to preferential adsorption of Xe over Kr as shown by the lower $Xe/N_2$ ratio relative to $Kr/N_2$ at any given time. Both Kr and Xe adsorptions reach equilibrium within 3 hours and more Xe relative to Kr is adsorbed. Note that the volume of the reference chamber is about half of the sample chamber which was kept the same for all measurements.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for separating Kr gas from Xe gas by selectively adsorbing Kr gas, the method comprising:
   providing a vessel comprising a Kr adsorbent bed comprising a natural clinoptilolite adsorbent;
   exposing a feed gas comprising Kr gas and Xe gas to the adsorbent bed for a residence time to selectively adsorb sufficient Kr gas from the feed gas to form a Xe enriched gas raffinate product;
   removing the Xe enriched gas raffinate product from the vessel; and
   thereafter regenerating the Kr adsorbent bed to form a Kr enriched gas extract product.

2. The method of claim 1, wherein the residence time for exposing the feed gas comprising Kr gas and Xe gas to the Kr adsorbent bed is for a time sufficient to maintain a greater Kr uptake amount than Xe uptake amount for the Kr adsorbent bed.

3. The method of claim 1, wherein the residence time to selectively adsorb the Kr gas is less than or equal to 70% of the total time to equilibrium of Kr gas within the Kr adsorbent bed.

4. The method of claim 1, wherein the residence time for exposing the feed gas comprising Kr gas and Xe gas to the Kr adsorbent bed is for a time equal to or less than 1 hour.

5. The method of claim 1, wherein the residence time for exposing the feed gas comprising Kr gas and Xe gas to the Kr adsorbent bed is for a time equal to or less than 30 minutes.

6. The method of claim 1, wherein the residence time for exposing the feed gas comprising Kr gas and Xe gas to the Kr adsorbent bed is for a time equal to or less than 15 minutes.

7. The method of claim 1, wherein the regenerating includes drawing a vacuum on the vessel.

8. The method of claim 1, wherein the regenerating includes heating the Kr adsorbent bed to a temperature sufficient to release adsorbed Kr gas.

9. A method for purifying Kr gas and Xe gas comprising:
   providing a vessel comprising a first Kr adsorbent bed comprising a natural clinoptilolite adsorbent;
   exposing a feed gas comprising Kr gas and Xe gas to the first Kr adsorbent bed for a residence time to selectively adsorb sufficient Kr gas from the feed gas to form a Xe enriched gas raffinate product;
   removing the Xe enriched gas raffinate product from the vessel and providing the Xe enriched gas raffinate product to an Xe adsorbent bed and exposing the Xe enriched gas raffinate product to the Xe adsorbent bed for a residence time to selectively adsorb sufficient Xe gas from the feed gas-Xe enriched gas raffinate product to form a purified Xe stream; and thereafter regenerating the Kr adsorbent bed to form a Kr enriched gas extract product and providing the Kr enriched gas extract product to a second Kr adsorbent bed for a residence time to selectively adsorb sufficient Kr gas from the feed gas to form a purified Kr stream.

10. The method of claim 9, further comprising providing the purified Xe stream to a second Xe adsorbent bed to further purify the purified Xe stream.

11. The method of claim 9, further comprising providing the purified Kr stream to a third Kr adsorbent bed to further purify the purified Kr stream.

12. The method of claim 9, wherein the residence time for exposing the feed gas comprising Kr gas and Xe gas to the first Kr adsorbent bed is for a time sufficient to maintain a greater Kr uptake amount than Xe uptake amount for the first Kr adsorbent bed.

13. The method of claim 9, wherein the residence time to selectively adsorb the Kr gas is less than or equal to 70% of the total time to equilibrium of Kr gas within the first Kr adsorbent bed.

14. The method of claim 9, wherein the residence time for exposing the feed gas comprising Kr gas and Xe gas to the first Kr adsorbent bed is for a time equal to or less than 1 hour.

15. The method of claim 9, wherein the residence time for exposing the feed gas comprising Kr gas and Xe gas to the first Kr adsorbent bed is for a time equal to or less than 30 minutes.

16. The method of claim 9, wherein the residence time for exposing the feed gas comprising Kr gas and Xe gas to the first Kr adsorbent bed is for a time equal to or less than 15 minutes.

17. The method of claim 9, wherein the Xe adsorbent bed comprises mordenite.

18. A system for separating Kr gas from Xe gas comprising:

a vessel containing a Kr adsorbent bed comprising natural clinoptilolite adsorbent;

a first valve arrangement arranged and disposed to remove a Xe enriched gas raffinate product stream from the vessel after a feed gas exposure to the Kr adsorbent bed; and a second valve arrangement and a regenerator arranged and disposed to regenerate the Kr adsorbent bed and release a Kr enriched gas extract product stream;

wherein is configured such that the feed gas can be exposed to the Kr adsorbent bed for a residence time to selectively adsorb sufficient Kr gas so the Xe enriched gas raffinate product can be removed; and thereafter the Kr adsorbent bed can be regenerated to form a Kr enriched gas extract product.

19. The system of claim 18, wherein the regenerator is a vacuum pump.

* * * * *